United States Patent
Shi et al.

(10) Patent No.: US 9,152,273 B2
(45) Date of Patent: Oct. 6, 2015

(54) TERMINAL AND METHOD FOR CONTROLLING A SCREEN

(71) Applicant: Xiaomi Inc., Beijing (CN)

(72) Inventors: Xinming Shi, Beijing (CN); Hao Di, Beijing (CN); Wei Sun, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 113 days.

(21) Appl. No.: 14/076,268

(22) Filed: Nov. 11, 2013

(65) Prior Publication Data

US 2014/0135070 A1 May 15, 2014

Related U.S. Application Data

(63) Continuation-in-part of application No. PCT/CN2013/078926, filed on Jul. 5, 2013.

(30) Foreign Application Priority Data

Nov. 12, 2012 (CN) .......................... 2012 1 0450649

(51) Int. Cl.
| | |
|---|---|
| H04M 1/00 | (2006.01) |
| G06F 3/042 | (2006.01) |
| H04M 3/42 | (2006.01) |
| G06F 1/32 | (2006.01) |
| G06F 3/044 | (2006.01) |

(52) U.S. Cl.
CPC .............. *G06F 3/042* (2013.01); *G06F 1/3231* (2013.01); *G06F 1/3265* (2013.01); *G06F 3/044* (2013.01); *H04M 3/42* (2013.01); *Y02B 60/1242* (2013.01); *Y02B 60/1289* (2013.01)

(58) Field of Classification Search
CPC .................... H04W 52/0254; H04W 52/027
USPC ................... 455/114.1, 271, 317, 566
See application file for complete search history.

(56) References Cited

U.S. PATENT DOCUMENTS

2009/0197615 A1    8/2009   Kim et al.

FOREIGN PATENT DOCUMENTS

| CN | 102478988 A | 5/2012 |
|---|---|---|
| CN | 202267942 U | 6/2012 |
| CN | 102629183 A | 8/2012 |

(Continued)

OTHER PUBLICATIONS

"International Search Report for PCT/CN2013/078926".

*Primary Examiner* — Tu X Nguyen
(74) *Attorney, Agent, or Firm* — Jun He Law Offices P.C.; James J. Zhu

(57) ABSTRACT

Embodiments of the present disclosure disclose a terminal and method for controlling a screen. The method comprises: during a calling or call originating process of the terminal, determining whether a distance between a specified area and a human body is larger than a distance threshold value based on an electrical signal generated by the screen when the specified area of a screen of the terminal gets close to the human body; controlling the screen to be off if it is determined that the distance is not larger than the distance threshold value, and controlling the screen to be on if it is determined that the distance is larger than the distance threshold value. By adopting the technical solution disclosed in the embodiments of the present disclosure, the on and off status of the screen can be controlled more precisely during the calling or call originating process of the terminal.

9 Claims, 2 Drawing Sheets

(56) References Cited

FOREIGN PATENT DOCUMENTS

| | | | |
|---|---|---|---|
| CN | 102855018 | A | 1/2013 |
| CN | 102937866 | A | 2/2013 |
| JP | 2010268336 | A | 11/2010 |

TERMINAL AND METHOD FOR CONTROLLING A SCREEN

CROSS REFERENCE TO RELATED APPLICATIONS

This application is a Continuation-In-Part of International Application PCT/CN2013/078926, with an international filing date of Jul. 5, 2013, which claims priority to Chinese Patent Application No. 201210450649.4, filed on Nov. 12, 2012, both of which are hereby incorporated by reference in their entireties.

TECHNICAL FIELD

The present disclosure generally relates to a touch screen of a terminal, and more particularly, to a method for controlling a screen of the terminal and the terminal thereof.

BACKGROUND

Currently, touch-screen terminals are used most frequently. However, when a user makes a phone call via such terminal, the terminal may be mis-operated due to a long-time contact between the screen of the terminal and the user's face or head. In the related technology, the problem is generally solved by using optical sensing technology to control the screen to be on and off, the principle of which is to sense the peripheral light condition with an optical sensor, and then inform a processing chip of a controller in the terminal to turn the screen on or off. During the calling process, the optical sensor at the front of the terminal senses the peripheral light condition. When the terminal gets close to a human body (such as ear) within a certain distance, the optical sensor senses that the light turns dark, so the controller turns off the screen. When the terminal gets away from the human body for a certain distance, the optical sensor senses that the light turns bright, so the controller turns on the screen.

However, the optical sensor lacks a measurable standard to determine the sensed light condition of the peripheral light, and the sensed condition is easy to be affected by the light intensity of the environment around the terminal. As a result, it is difficult to control the screen to be on and off precisely.

SUMMARY

The present disclosure discloses a method for controlling a screen in a terminal and terminal thereof to enable the screen to be controlled precisely during the calling process or call originating process of the terminal.

In one aspect, the present disclosure provides a method for controlling a screen of a terminal comprising: during a calling process or a call originating process of the terminal, determining whether a distance between a specified area of the screen and a human body is larger than a distance threshold value based on an electrical signal generated by the screen when the specified area of the screen gets close to the human body; controlling the screen to be off if it is determined that the distance is not larger than the distance threshold value, and controlling the screen to be on if it is determined that the distance is larger than the distance threshold value.

For example, the step of determining whether the distance between the specified area and the human body is larger than the distance threshold value based on the electrical signal generated by the screen when the specified area of the screen of the terminal gets close to the human body comprises: detecting a capacitance value of a contact capacitance generated by the screen when the specified area of the screen gets close to the human body; determining that the distance between the specified area and the human body is not larger than the distance threshold value when the capacitance value is not less than the capacitance threshold value; and determining that the distance between the specified area and the human body is larger than the distance threshold value when the capacitance value is less than the capacitance threshold value.

For example, the steps of determining whether the distance between the specified area and the human body is larger than the distance threshold value based on the electrical signal generated by the screen when the specified area of the screen of the terminal gets close to the human body comprises: detecting a current value of a supplemental current of a contact capacitance generated by the screen when the specified area of the screen gets close to the human body; determining that the distance between the specified area and the human body is not larger than the distance threshold value when the current value is not less than the current threshold value; and determining that the distance between the specified area and the human body is larger than the distance threshold value when the current value is less than the current threshold value.

For example, the method further comprises: determining whether the terminal is in the calling process or the call originating process by a radio frequency module of the terminal.

For example, the specified area is located in any position near a receiver on the screen.

In another aspect, the present disclosure provides a terminal comprising: one or more processors; a screen coupled to the one or more processors; and a memory coupled to the one or more processors; wherein the one or more processors are configured to: during a calling process or a call originating process of the terminal, determine whether a distance between a specified area of the screen and a human body is larger than a distance threshold value based on an electrical signal generated by the screen when the specified area of the screen gets close to the human body; control the screen to be off if it is determined that the distance is not larger than the distance threshold value, and control the screen to be on if it is determined that the distance is larger than the distance threshold value.

In yet another aspect, the present disclosure provides a computer readable recording medium storing one or more programs for use by a terminal to perform a procedure comprising: during a calling process or a call originating process of the terminal, determining whether a distance between a specified area of the screen and a human body is larger than a distance threshold value based on an electrical signal generated by the screen when the specified area of the screen gets close to the human body; controlling the screen to be off if it is determined that the distance is not larger than the distance threshold value, and controlling the screen to be on if it is determined that the distance is larger than the distance threshold value.

In yet another aspect, the present disclosure provides a terminal, comprising: a detecting module for determining whether the distance between the specified area and a human body is larger than the distance threshold value based on an electrical signal generated by a screen when the specified area of the screen of the terminal gets close to the human body during a calling process or a call originating process of the terminal; a controlling module for controlling the screen to be off if it is determined that the distance is not larger than the distance threshold value, and controlling the screen to be on if it is determined that the distance is larger than the distance threshold value.

In the technical solution disclosed in the embodiments of the present disclosure, during the calling or call originating process of the terminal, whether the distance between the specified area and the human body is larger than a distance threshold value is determined based on the electrical signal generated by the screen when the specified area on the screen of the terminal gets close to the human body. If the distance is not larger than the distance threshold value, the screen is controlled to be off. If the distance is larger than the distance threshold value, the screen is controlled to be on. Since the method of the present disclosure discloses a measurable control standard for controlling the screen to be on and off, it can control more precise the on and off status of the screen compared to the traditional method of sensing the light intensity by the optical sensor in the related art.

It is to be understood that both the foregoing general description and the following detailed description of the present disclosure are exemplary and explanatory, and are intended to provide further explanation of the invention as claimed.

BRIEF DESCRIPTION OF THE DRAWINGS

The drawings are provided to further illustrate the present disclosure, constituted part of the present specification, and used to explain the present disclosure, along with the embodiments of the present disclosure. The below drawings are provided for the purpose of illustration only, and are not limitative of the present disclosure.

Figure 1:
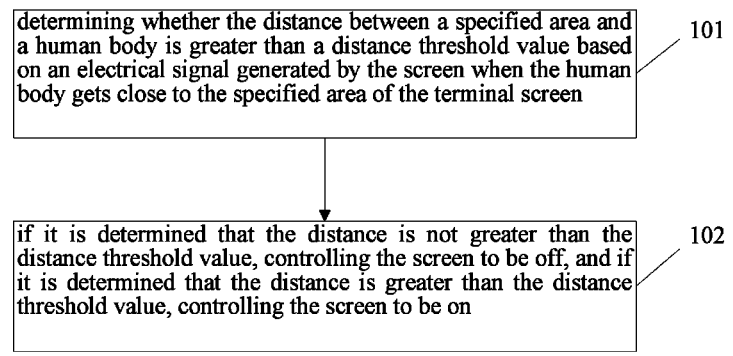
FIG. 1 is a flowchart showing a method for controlling a screen of a terminal in accordance with some embodiments of the present disclosure.

Specific embodiments in this present disclosure have been shown by way of example in the foregoing drawings and are hereinafter described in detail. The drawings and written description are not intended to limit the scope of the inventive concepts in any manner. Rather, they are provided to illustrate the inventive concepts to a person skilled in the art by reference to particular embodiments.

DETAILED DESCRIPTION

In order to control the on and off status of the screen more precisely during the calling or call originating process of the terminal, embodiments of the present disclosure disclose a terminal and method for controlling the screen of the terminal. The preferred embodiments of the present disclosure are being described accompanying with the drawings, it will be appreciated that the detailed description of preferred embodiments are used to illustrate and explain the present disclosure only, not for limiting the scope of the present disclosure. And the features in different embodiments can be combined with each other under the situation that such features are not in conflict with each other.

As used herein, the "terminal" may be implemented using a variety of terminal devices. Examples of such terminal devices include mobile phones, computers, digital broadcast terminals, messaging devices, gaming consoles, tablets, pads, medical devices, exercise equipment, personal digital assistants, and the like.

The terminal includes one or more processors to receive various data, programs and instructions, and to process such data, programs and instructions accordingly. The one or more processors may include any processing or control circuitry operative to control the operations and performance of the terminal. In some embodiments, the processors may include any micro-processing circuitry or chips to control some particular parts of the terminal. The terminal also includes a memory which is coupled to the one or more processors and is configured to store the data, programs and instructions to be processed by the processors. In some embodiments, the terminal may further include input modules, such as a keyboard, a mouse or the like.

Furthermore, the terminal includes a screen which is coupled to the one or more processors and configured to provide an output interface between the terminal and the user. In some embodiments, the screen may comprise a liquid crystal display (LCD) and a touch panel (TP). If the screen includes the touch panel, the screen may be implemented as a touch screen to receive input signals from the users. In some embodiments of the present invention, the screen of the terminal is implemented as a touch screen. The touch screen includes one or more chips or microprocessors to determine the change of electronic signal on the touch panel and control the touch screen to respond to the change of the electronic signal.

The following description explains the method for controlling the screen of the terminal in accordance with some embodiments of the present disclosure.

As shown in FIG. 1, the method for controlling the screen of the terminal in accordance with some embodiments of the present disclosure includes the following steps.

In step 101, it is determined by the terminal whether the distance between a specified area of the screen and a human body is larger than a distance threshold value based on an electrical signal generated by the screen when the human body gets close to the specified area of the screen during the terminal's calling or call originating process.

In step 102, if it is determined that the distance is not larger than the distance threshold value, the terminal controls the screen to be off. If it is determined that the distance is larger than the distance threshold value, the terminal controls the screen to be on.

In some embodiments, the electrical signal in step 101 may be a contact capacitance value generated by the screen when the specified area of the screen gets close to the human body, a supplemental current value of the contact capacitance generated by the screen when the specified area of the screen gets close to the human body, or a voltage value generated by the screen when the specified area of the screen gets close to the human body. Correspondingly, there are some available methods to determine whether the distance between the specified area and the human body is larger than the distance threshold value based on the electrical signal generated by the screen when the specified area of the screen gets close to the human body.

As exemplary embodiments, two methods of determining whether the distance between the specified area and the human body is larger than the distance threshold value based on the electrical signal generated by the screen are described below.

The first method comprises the following steps: detecting the capacitance value of the contact capacitance generated by the screen when the specified area of the screen gets close to the human body; if the capacitance value is not less than the capacitance threshold value, it is determined that the distance between the specified area and the human body is not larger than the distance threshold value; and if the capacitance value is less than the capacitance threshold value, it is determined that the distance between the specified area and the human body is larger than the distance threshold value.

The second method comprises the following steps: detecting the supplemental current value of the contact capacitance generated by the screen when the specified area of the screen gets close to the human body; if the current value is not less than the current threshold value, it is determined that the distance between the specified area and the human body is not larger than the distance threshold value; and if the current value is less than the current threshold value, it is determined that the distance between the specified area and the human body is larger than the distance threshold value.

The embodiments are described below in detail to illustrate the method and the terminal disclosed in the present disclosure with the accompanying drawings.

Embodiment 1:

In the first embodiment, during the calling or call originating process of the terminal, based on whether the distance between the specified area of the screen of the terminal and the human body is larger than the distance threshold value, the on and off status of the screen can be controlled, which can be determined based on the contact capacitance generated by the screen when the specified area of the screen gets close to the human body in the present disclosure.

For example, if the screen is a capacitive touch screen or a resistive touch screen, when the human body contacts a capacitance sensing area on the screen, a coupling capacity is generated between the human body electric field and the surface of the touch screen. Actually, when the human body gets close to the screen within a certain distance even without direct contact, the coupling capacity can be generated.

In the first embodiment of the present disclosure, whether the distance between the screen and human body is larger than the distance threshold value is determined based on the contact capacitance generated by the screen when the human body gets close to the screen, thereby controlling the on and off status of the screen.

Figure 2:
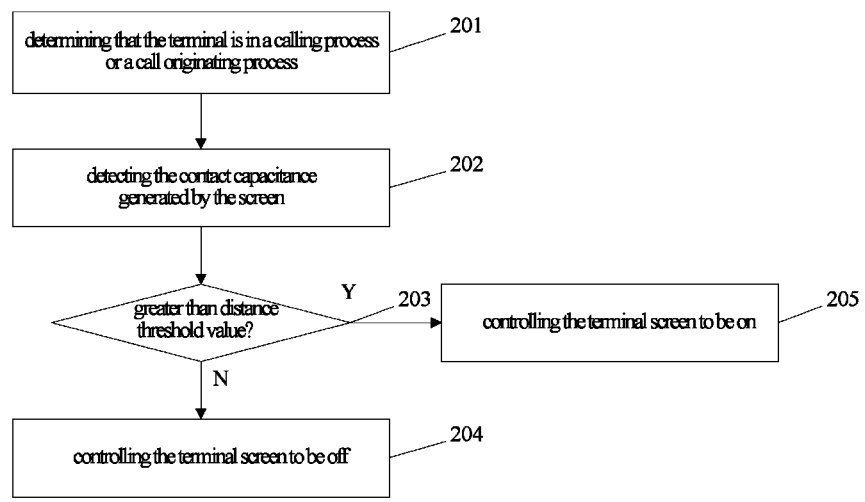
FIG. 2 is a flowchart showing a method for controlling a screen of a terminal in accordance with a first embodiment of the present disclosure.

FIG. 2 is a flowchart of the method for controlling a screen of the terminal in accordance with the first embodiment of the present disclosure. As shown in FIG. 2, the method for controlling the screen of the terminal in accordance with the first embodiment of the present disclosure includes the following steps.

In step 201, upon confirming that the terminal is in a calling process or a call originating process, a radio frequency module in the terminal may be used to detect and determine the current calling or call originating status when the user uses the terminal to call or initiate a call.

In step 202, during the calling or call originating process of the terminal, the terminal initiates the detection of electrical signal generated by the screen when the specified area of the screen of the terminal gets close to the human body. Specifically, the terminal detects the capacitance value of the contact capacitance generated by the screen when the specified area of the screen of the terminal gets close to the human body. Preferably, the one or more chips or microprocessors of the touch screen in the terminal are designed to detect the capacitance value of the contact capacitance generated by the screen.

In the first embodiment, the specified area of the screen of the terminal may be set flexibly according to actual demand. For example, the specified area may be set on the screen near the receiver, and the size and shape of which may be adapted to the size of the PCB (printed circuit board) around the receiver.

In step 203, the terminal determines whether the distance between the specified area and the human body is larger than the distance threshold value based on the detected capacitance value of the contact capacitance generated by the screen. If the distance between the specified area and the human body is not larger than the distance threshold value, the method proceeds with 204, otherwise the method proceeds with step 205.

The detailed procedure of determination is listed as follows: when the capacitance value of the detected contact capacitance is not less than the capacitance threshold value, it is determined that the distance between the specified area and the human body is not larger than the distance threshold value; when the capacitance value is less than the capacitance threshold value, it is determined that the distance between the specified area and the human body is larger than the distance threshold value. The capacitance threshold value is the capacitance value of the contact capacitance generated by the screen when the distance between the specified area and the human body equals to the distance threshold value.

In step 204, the terminal controls the screen of the terminal to be off.

In step 205, the terminal controls the screen of the terminal to be on.

Preferably, the one or more chips or microprocessors of the touch screen in the terminal are designed to control the off and on status of the screen.

By adopting the method disclosed in the first embodiment, it is determined whether the distance between the screen and the human body is larger than the distance threshold value based on the relationship between the capacitance value of the contact capacitance generated by the screen when the screen gets close to the human body and the capacitance threshold value. Thus the on and off status of the screen can be controlled more precise based on the measurable control standard.

Embodiment 2:

In the second embodiment, during the calling or call originating process of the terminal, based on whether the distance between the specified area of the screen of the terminal and the human body is larger than the distance threshold value, the on and off status of the screen can be controlled, which can be determined based on the supplemental current of the contact capacitance generated by the screen when the specified area of the screen gets close to the human body in the present disclosure.

For example, if the screen is a capacitive touch screen or a resistive touch screen, when the human body contacts the capacitance sensing area on the screen, a coupling capacity is generated between the human body electric filed and the surface of touch screen. As to high-frequency current, the capacitor is a direct conductor, thus the human body may absorb a small current generated through supplementing the touch screen's electrode, which can be called a supplemental current. Actually, when the human body gets close to the screen within a certain distance even without direct contact, the coupling capacity as well as the corresponding supplemental current can be generated.

In the second embodiment of the present disclosure, whether the distance between the screen and human body is larger than the distance threshold value is determined based on the supplemental current of the contact capacitance generated by the screen when the human body gets close to the screen, thereby controlling the on and off status of the screen.

Figure 3:
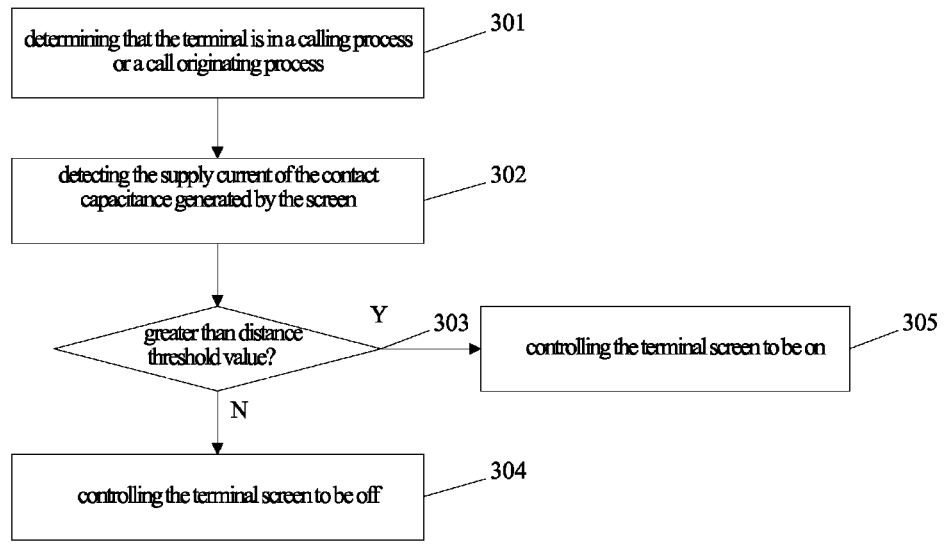
FIG. 3 is a flowchart showing a method for controlling a screen of a terminal in accordance with a second embodiment of the present disclosure.

FIG. 3 is a flowchart of the method for controlling a screen of the terminal in accordance with the second embodiment of the present disclosure. As shown in FIG. 3, the method for controlling the screen of the terminal in accordance with the second embodiment of the present disclosure includes the following steps.

In step 301, upon confirming that the terminal is in a calling process or a call originating process, a radio frequency module in the terminal may be used to detect and determine the current calling or call originating status when the user uses the terminal to call or initiate a call.

In step 302, during the calling or call originating process of the terminal, the terminal initiates the detection of electrical signal generated by the screen when the specified area of the screen of the terminal gets close to the human body. Specifically, the terminal detects the value of the supplemental current of the contact capacitance generated by the screen when the specified area of the screen of the terminal gets close to the human body. Preferably, the one or more chips or microprocessors of the touch screen in the terminal are designed to detect the value of the supplemental current of capacitance value of the contact capacitance generated by the screen.

In the second embodiment, the specified area of the screen of the terminal may be set flexibly according to actual demand, for example the specified area may be set on the screen near the receiver, and the size and shape of which may be adapted to the size of the PCB (printed circuit board) around the receiver.

In step 303, the terminal determines whether the distance between the specified area and the human body is larger than the distance threshold value based on the detected value of the supplemental current of the contact capacitance generated by the screen. If the distance between the specified area and the human body is not larger than the distance threshold value, the method proceeds with 304, otherwise the method proceeds with step 305.

The detailed method of determination is listed as follows: when the detected value of the supplemental current of the contact capacitance is not less than a current threshold value, it is determined that the distance between the specified area and the human body is not larger than the distance threshold value; when the current value is less than the current threshold value, it is determined that the distance between the specified area and the human body is larger than the distance threshold value. The current threshold value is the value of the supplemental current of the contact capacitance generated by the screen when the distance between the specified area and the human body equals to the distance threshold value.

In step 304, the terminal controls the screen of the terminal to be off.

In step 305, the terminal controls the screen of the terminal to be on.

Preferably, the one or more chips or microprocessors of the touch screen in the terminal are designed to control the off and on status of the screen.

By adopting the method disclosed in the second embodiment, it is determined whether the distance between the screen and the human body is larger than the distance threshold value based on the relationship between the value of the supplemental current of the contact capacitance generated by the screen when the screen gets close to the human body and the current threshold value. Thus the on and off status of the screen can be controlled more precise based on the measurable control standard.

Figure 4:
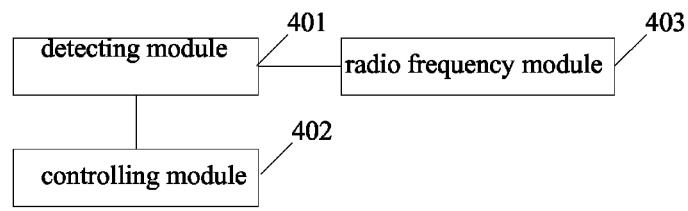
FIG. 4 is a schematic diagram showing the structure of the terminal in accordance with a third embodiment of the present disclosure.

Embodiment 3:

Based on the same inventive concept, according to the method for controlling the screen of the terminal disclosed in the above embodiments of the present disclosure, the third embodiment of the present disclosure further discloses a corresponding terminal. As shown in FIG. 4, the terminal in accordance with the third embodiment of the present disclosure includes the modules as described below.

The terminal includes a detecting module 401, for determining whether the distance between the specified area and the human body is larger than the distance threshold value based on the electrical signal generated by the screen when the specified area of the screen of the terminal gets close to the human body during the terminal's calling or call originating process;

The terminal further includes a controlling module 402, for controlling the screen to be off if it is determined that the distance is not larger than the distance threshold value, and controlling the screen to be on if it is determined that the distance is larger than the distance threshold value.

Preferably, the one or more chips or microprocessors of the touch screen in the terminal are designed to includes the detecting module 401 and the controlling module 402 to determine whether the distance between the specified area and the human body is larger than the distance threshold value based on the electrical signal and control the off and on status of the screen accordingly.

Preferably, the detecting module 401 is used to determine the capacitance value of the contact capacitance generated by the screen when the specified area of the screen of the terminal gets close to the human body. When the capacitance value is not less than the capacitance threshold value, it is determined by the detecting module 401 that the distance between the specified area and the human body is not larger than the distance threshold value. When the capacitance value is less than the capacitance threshold value, it is determined by the detecting module 401 that the distance between the specified area and the human body is larger than the distance threshold value.

Alternatively, the detecting module 401 is used to determine the value of the supplemental current of the contact capacitance generated by the screen when the specified area of the screen of the terminal gets close to the human body. When the current value is not less than the current threshold value, it is determined by the detecting module 401 that the distance between the specified area and the human body is not larger than the distance threshold value. When the current value is less than the current threshold value, it is determined the detecting module 401 that the distance between the specified area and the human body is larger than the distance threshold value.

Preferably, the terminal further comprises a radio frequency module 403 for determining whether the terminal is in the calling or call originating process, and informing the detecting module 401.

Preferably, the detecting module is used to detect the distance between the human body and the specified area, which is located on the screen near the receiver.

To sum up, the technical solution disclosed in the embodiments of the present disclosure comprises: determining whether the distance between the specified area and the human body is larger than a distance threshold value based on the electrical signal generated by the screen when the specified area of the screen of the terminal gets close to the human body during the calling or call originating process of the terminal; controlling the screen to be off if it is determined that the distance is not larger than the distance threshold value; controlling the screen to be on if it is determined that the distance is larger than the distance threshold value. By adopting the technical solution disclosed in the embodiments of the present disclosure, the on and off status of the screen can be controlled more precisely during the calling or call originating process of the terminal.

Various embodiments described herein may be implemented in a computer readable recording medium storing one or more programs for use by one or more chips, microprocessors or processors of the terminal. The computer can also include the terminal as defined in the present disclosure.

The computer readable recording medium may use, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory of the terminal.

The aforementioned methods can be implemented in a computer readable media recording computer readable codes. The computer readable media include all kinds of recording devices in which data readable by a computer system are stored. The computer readable media include ROM, RAM, CD-ROM, magnetic tapes, floppy discs, optical data storage devices, and the like, as well as carrier-wave type implementations (e.g., transmission via Internet).

The foregoing description, for purpose of explanation, has been described with reference to embodiments. The present disclosure may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method for controlling a screen of a terminal, comprising:
   during a calling process or a call originating process of the terminal, determining whether a distance between a specified area of the screen and a human body is larger than a distance threshold value based on an electrical signal generated by the screen when the specified area of the screen gets close to the human body;
   controlling the screen to be off if it is determined that the distance is not larger than the distance threshold value, and
   controlling the screen to be on if it is determined that the distance is larger than the distance threshold value;
   wherein determining whether the distance between the specified area and the human body is larger than the distance threshold value comprises:
   detecting a current value of a supplemental current of a contact capacitance generated by the screen when the specified area of the screen gets close to the human body;
   determining that the distance between the specified area and the human body is not larger than the distance threshold value when the current value is not less than the current threshold value; and
   determining that the distance between the specified area and the human body is larger than the distance threshold value when the current value is less than the current threshold value.

2. The method according to claim 1, further comprising: determining whether the terminal is in the calling process or the call originating process by a radio frequency module of the terminal.

3. The method according to claim 1, wherein the specified area is located on the screen near a receiver.

4. A terminal, comprising:
   one or more processors;
   a screen coupled to the one or more processors; and
   a memory coupled to the one or more processors;
   wherein the one or more processors are configured to perform:
   during a calling process or a call originating process of the terminal, determining whether a distance between a specified area of the screen and a human body is larger than a distance threshold value based on an electrical signal generated by the screen when the specified area of the screen gets close to the human body;
   controlling the screen to be off if it is determined that the distance is not larger than the distance threshold value, and
   controlling the screen to be on if it is determined that the distance is larger than the distance threshold value,
   wherein determining whether the distance between the specified area and the human body is larger than the distance threshold value comprises:
   detecting a current value of a supplemental current of a contact capacitance generated by the screen when the specified area of the screen gets close to the human body;
   determining that the distance between the specified area and the human body is not larger than the distance threshold value when the current value is not less than the current threshold value; and
   determining that the distance between the specified area and the human body is larger than the distance threshold value when the current value is less than the current threshold value.

5. The terminal according to claim 4, further comprising: a radio frequency module for determining whether the terminal is in the calling process or a call originating process, and informing the one or more processors.

6. The terminal according to claim 4, wherein the specified area is located on the screen near a receiver.

7. A non-transitory computer readable recording medium storing one or more programs for use by a terminal to perform a procedure comprising:
   during a calling process or a call originating process of the terminal, determining whether a distance between a specified area of the screen and a human body is larger than a distance threshold value based on an electrical signal generated by the screen when the specified area of the screen gets close to the human body;
   controlling the screen to be off if it is determined that the distance is not larger than the distance threshold value; and controlling the screen to be on if it is determined that the distance is larger than the distance threshold value, wherein determining whether the distance between the specified area and the human body is larger than the distance threshold value comprises:

detecting a current value of a supplemental current of a contact capacitance generated by the screen when the specified area of the screen gets close to the human body;

determining that the distance between the specified area and the human body is not larger than the distance threshold value when the current value is not less than the current threshold value; and determining that the distance between the specified area and the human body is larger than the distance threshold value when the current value is less than the current threshold value.

8. The computer readable recording medium according to claim 7, wherein the procedure further comprises: determining whether the terminal is in the calling process or the call originating process by a radio frequency module of the terminal.

9. The computer readable recording medium according to claim 7, wherein the specified area is located on the screen near a receiver.

* * * * *